(12) United States Patent
Hoffman

(10) Patent No.: US 6,505,846 B1
(45) Date of Patent: Jan. 14, 2003

(54) BICYCLE CABLE LOCKING SYSTEM

(75) Inventor: Thomas W. Hoffman, Boise, ID (US)

(73) Assignee: E Z Lock, LLC, Boise, ID (US)

( * ) Notice: Subject to any disclaimer, the term of this patent is extended or adjusted under 35 U.S.C. 154(b) by 0 days.

(21) Appl. No.: 09/666,162

(22) Filed: Sep. 20, 2000

(51) Int. Cl.$^7$ .............................. B62K 3/02; B62H 5/00
(52) U.S. Cl. ...................... 280/274; 280/288.4; 70/233
(58) Field of Search .................... 70/233; 280/274, 280/281.1, 288.4

(56) References Cited

U.S. PATENT DOCUMENTS

| | | | |
|---|---|---|---|
| 3,687,472 A | | 8/1972 | Struble, Jr. ........... 280/11.37 B |
| 4,023,387 A | * | 5/1977 | Gould ........................ 70/233 |
| 4,126,024 A | | 11/1978 | Timmons et al. ............ 70/233 |
| 4,188,808 A | | 2/1980 | Valdez ........................ 70/233 |
| 4,267,715 A | | 5/1981 | Aylesworth ................. 70/58 |
| 4,379,393 A | * | 4/1983 | Schott et al. ............... 70/233 |
| 4,870,843 A | * | 10/1989 | Lundberg ................... 70/233 |
| 4,970,882 A | | 11/1990 | Arrendondo ................ 70/30 |
| 5,063,762 A | | 11/1991 | Vandeweghe ................ 70/30 |
| 5,289,704 A | | 3/1994 | Johnson ....................... 70/30 |
| 5,513,508 A | * | 5/1996 | Saunders et al. ........... 280/201 |
| 5,564,129 A | | 10/1996 | Ball et al. ................... 2/422 |

FOREIGN PATENT DOCUMENTS

| | | | | |
|---|---|---|---|---|
| DE | 876220 | * | 5/1953 | ........... 70/234 |
| DE | 3046810 | * | 7/1982 | ........... 70/223 |
| FR | 2276210 | * | 1/1976 | ........... 70/233 |
| NL | 7809670 | * | 12/1979 | ........... 70/233 |
| WO | 91/00949 | * | 1/1991 | ........... 70/233 |
| WO | 92/02400 | * | 2/1992 | ........... 70/233 |

* cited by examiner

*Primary Examiner*—Daniel G. DePumpo
(74) *Attorney, Agent, or Firm*—Ormiston & McKinney, PLLC

(57) ABSTRACT

A bicycle cable locking system in which a double length cable stowed in one of the frame tubes automatically surrounds the head as it is withdrawn from a stowed position to an extended position, and a double or single length cable stowed in one of the frame tubes that automatically retracts back into the stowed position when it is released from an extended position. The ends of the cable may be secured with an in-line lock integral to the cable or with a pad lock by constructing the ends the cable as a loop.

5 Claims, 12 Drawing Sheets

BICYCLE CABLE LOCKING SYSTEM

FIELD OF THE INVENTION

The invention relates to bicycle locks.

BACKGROUND

Bicycle theft is a long-standing and serious problem for bicycle owners. The need for an effective theft deterrent has lead to the design of many different bicycle locks and locking systems. One of the most popular bicycle locks is a flexible cable looped at each end and secured with a padlock. The cable is usually snaked around part of the bicycle frame and sometimes through the front wheel and around a bicycle rack, lamp post or other fixed object. The cable is secured with a padlock through the end loops. Some cable locks use an in-line lock integral to the cable instead of the padlock with looped ends. While these types of cable locks are inexpensive and uncomplicated, they have several disadvantages. First, because these cable locks are not tethered to the bicycle, they can be lost. In fact, I first began working on a new locking system because my son kept losing his cable. Second, cables and locks must be stored apart from the bicycle, in a saddle bag or backpack for example, or wound around the bicycle frame. In either case, the cable and lock must be unpacked or unwound or both to lock the bicycle. Self coiling cables present added difficulties—it is often a struggle to unwind the cable from the frame, get it straight enough to thread through the frame and front wheel and then around the bike rack and locked. Also, cable locks stored wound around the bicycle frame are generally not considered aesthetically pleasing, particularly for the newer ultra-high tech way expensive bicycles decked out in super-duper high definition color graphics.

Several designs have been developed in an effort to overcome some of the disadvantages of bicycle cable locks. U.S. Pat. Nos. 4,970,882, 4,188,808 and 4,126,024 disclose cable type retractable bicycle locking systems typical of the prior art. In these retractable locking systems, the locking cable is retracted and stored on a reel that is mounted to the bicycle frame. While these systems make the cable easier to store and difficult to lose, the relatively large size and weight of the reel and reel housing necessary to contain the locking cable impede performance of the bicycle and are unsightly. U.S. Pat. No. 5,289,704 discloses a seemingly simple and more practical cable lock storage arrangement. The '704 patent discloses a cable lock configured for storage in the seat tube of a bicycle. The cable slides into the seat tube for storage and is withdrawn from the seat tube for use. This cable lock uses a conventional locking cable doubled over and secured at the ends by a specially constructed bullet shaped combination lock. This specially constructed lock is designed to fit into and cap an extension of the bicycle seat tube to present a streamlined unobtrusive aesthetically pleasing look. One obvious disadvantage of the locking system of the '704 patent, however, is the need for a specially constructed lock. Also, because the cable is not tethered to the bicycle, it can be lost and is not automatically retracted into the stowed position within the seat tube.

SUMMARY

The present invention is directed to a bicycle cable locking system that helps overcome some of the disadvantages of conventional cable locking systems. Various embodiments of the invention implement several novel features, including a double length cable stowed in one of the frame tubes that automatically surrounds the head as it is withdrawn from a stowed position to an extended position, and a double or single length cable stowed in one of the frame tubes that automatically retracts back into the stowed position when it is released from an extended position.

In one embodiment of the invention, the cable locking system includes a cable extendible from and automatically retractable into a frame tube of a bicycle.

In another embodiment, the cable locking system includes a double length cable extendible from and automatically retractable into at least one of the frame tubes of a bicycle and each length of the cable extends along opposite sides of the head such that the cable straddles the head when the cable is withdrawn from the tube.

The ends of the cable may be secured with an in-line lock integral to the cable or with a pad lock by constructing the or ends the cable as a loop.

The foregoing summary is not intended to be an inclusive list of all aspects and features of the invention nor should any limitation on the scope of the invention be implied from this summary. The summary is provided in accordance with the requirements of 37 C.F.R. §1.73 and the Manual of Patent Examining Procedure (MPEP) 608.01(d) merely to apprise the public of the nature of the invention.

BRIEF DESCRIPTION OF THE DRAWINGS

FIGS. 2–4 show the cable in the retracted and stowed position in the bicycle frame.

FIG. 5 shows the cable in the retracted and stowed position.

FIG. 6 shows the cable in the retracted and stowed position. FIG. 7 shows the cable in the extended position secured to a bicycle rack.

FIG. 8 shows the cable in the stowed position. FIG. 9 shows the cable in the extended position secured to a bicycle rack.

DETAILED DESCRIPTION

Figure 1:
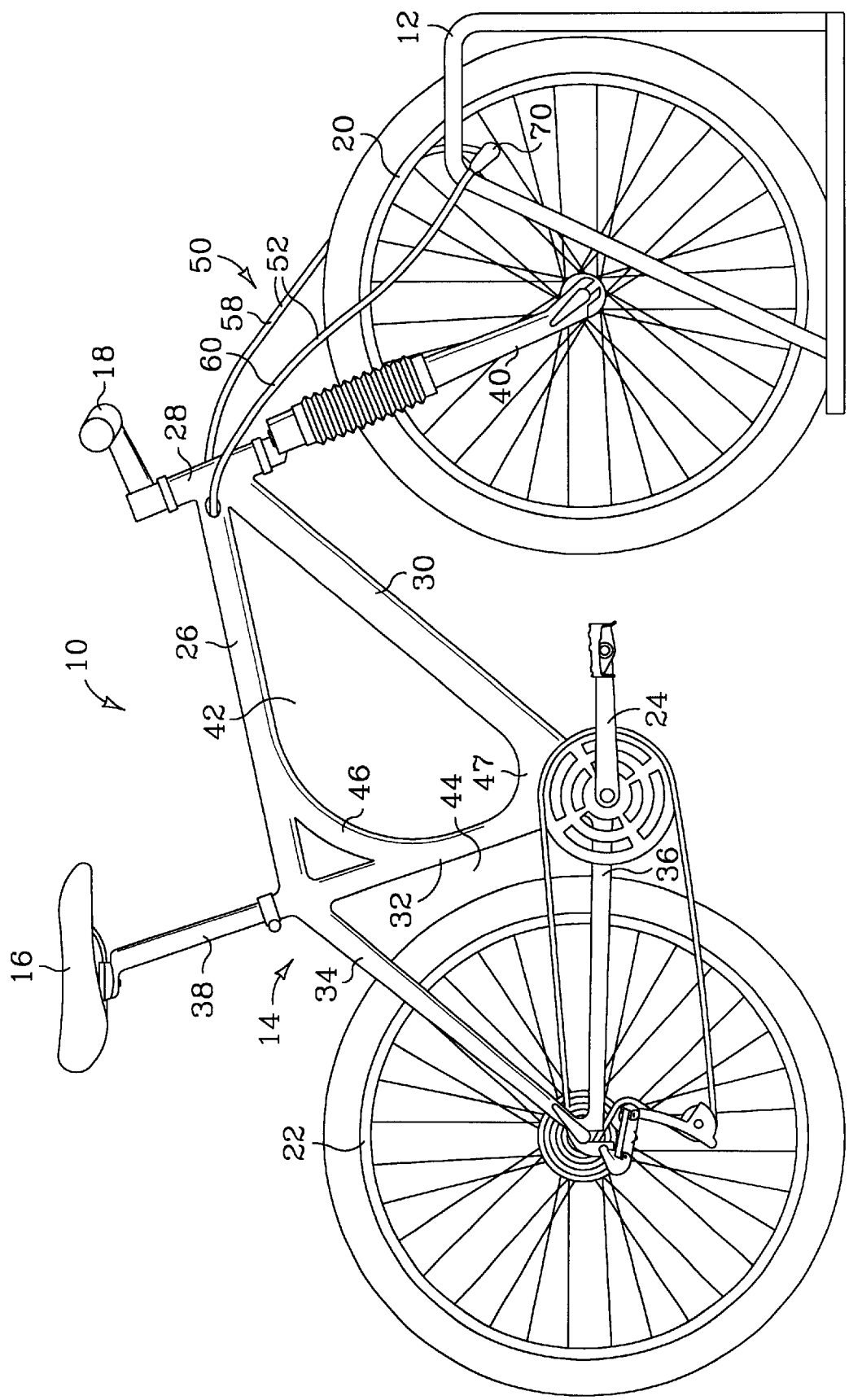
FIG. 1 is a side elevation view of a bicycle secured to a rack showing one embodiment of the invented cable lock in the extended position.

FIGS. 1–4 illustrates various configurations of one embodiment of the invention in which a retractable double length cable is used to secure a bicycle 10 to a bicycle rack 12. Referring to FIGS. 1–4, bicycle 10 includes a frame 14, seat 16, handlebars 18, front wheel 20, rear wheel 22 and pedal crank 24. A typical bicycle frame, such as frame 14, includes a top tube 26, head 28, down tube 30, seat tube 32, seat stays 34 and chain stays 36. Seat 16 is mounted to frame 14 through a seat post 38 in seat tube 32. Handlebars 18 and front forks 40 are mounted to frame 14 through head 28. The "head" of the bicycle frame refers generally to that part of the frame 14 mounts or supports the handle bars and the front forks. The head is usually structurally connected to the front of the top tube and the down tube.

The top, down and seat tubes 26, 30 and 32 outline what is commonly referred to as the front triangle 42 of bicycle 10. The seat tube 32 and seat and chain stays 34 and 36 outline what is commonly referred to as the rear triangle 44 of bicycle 10.

Figure 2:
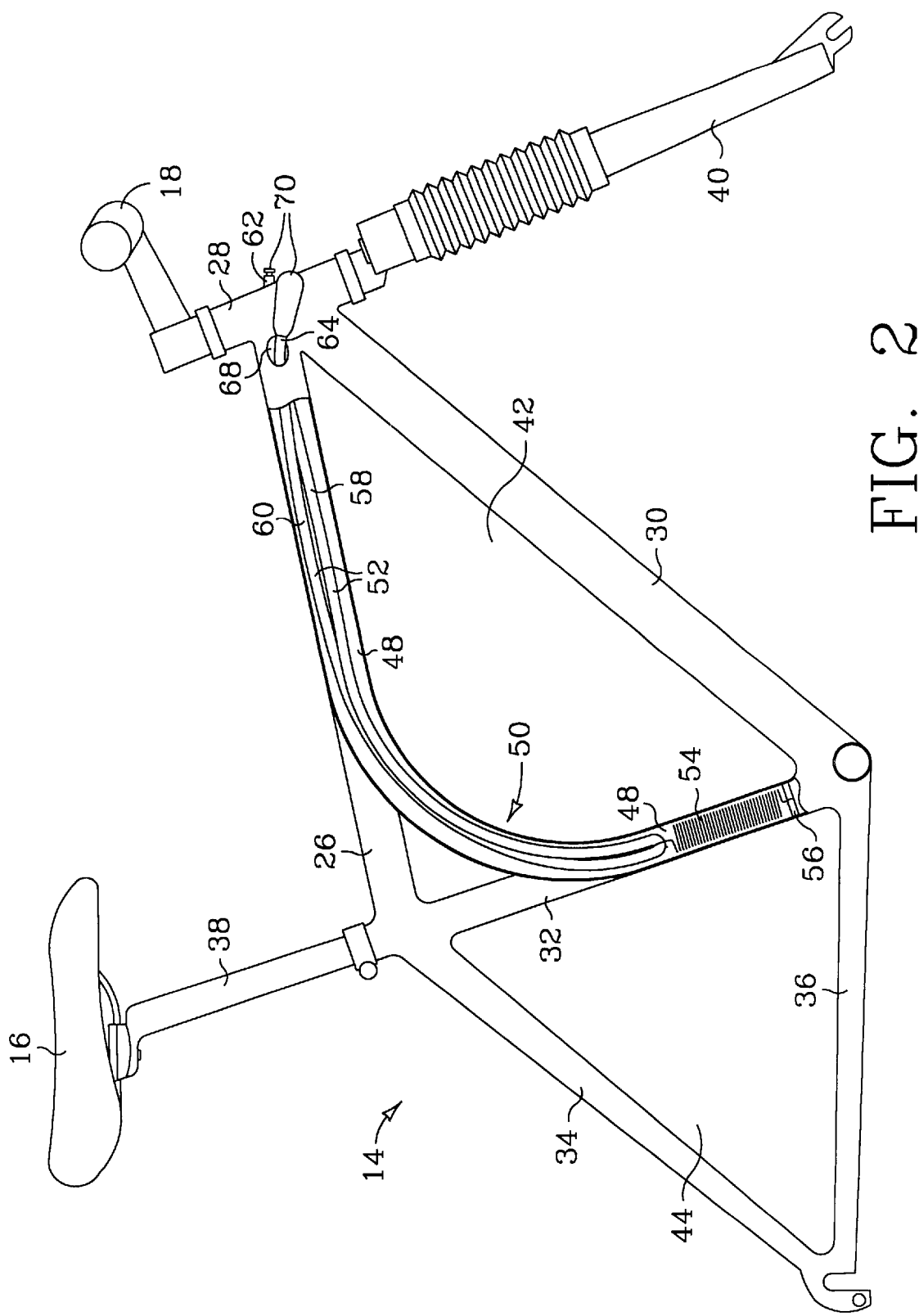
FIGS. 2–4 are partial cut-away detail views of three alternative configurations of one embodiment of the invented cable lock in which a folded double length of cable is automatically retracted into the bicycle frame along the top tube and down along the seat tube using an extension type coil spring.
Figure 3:
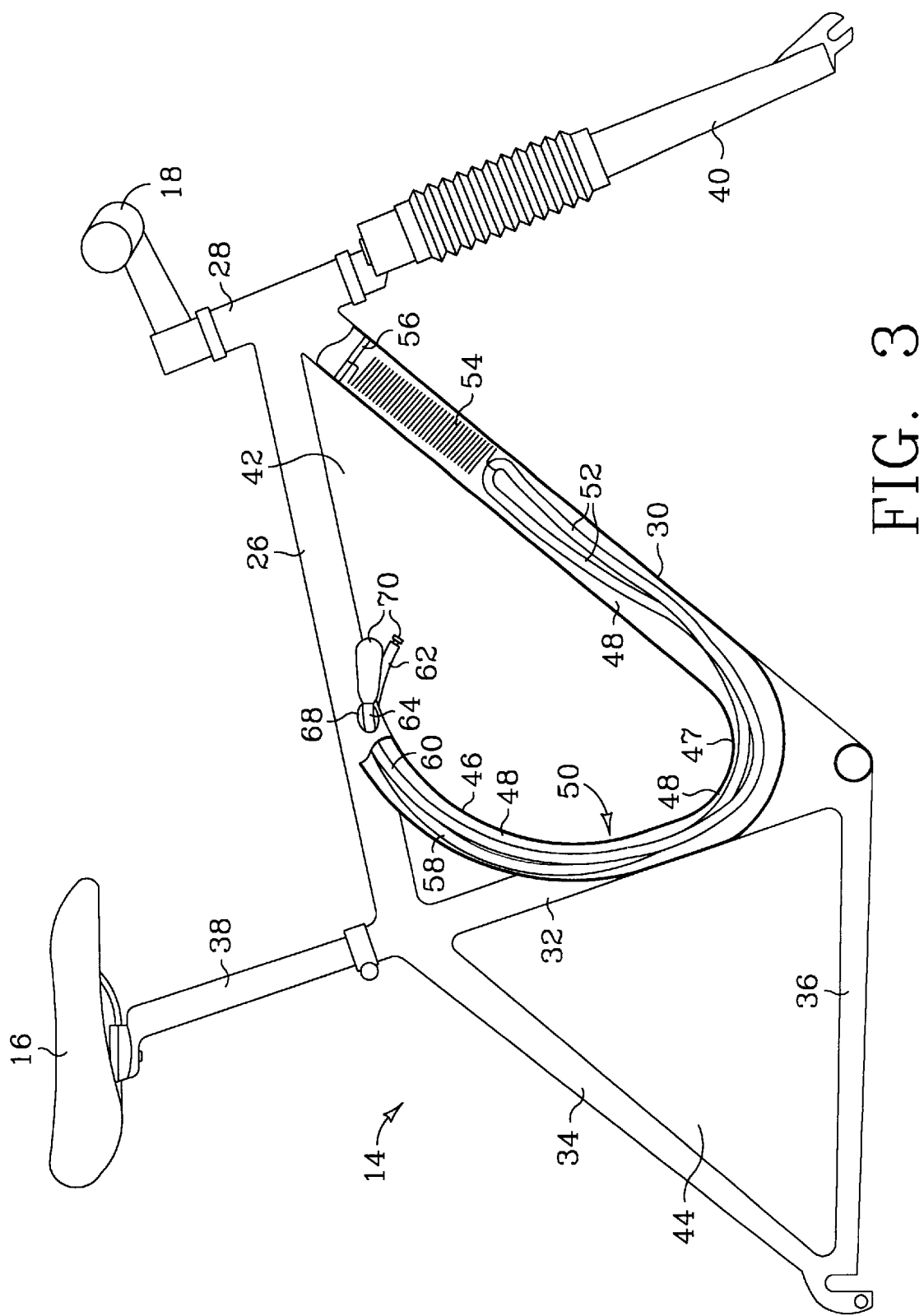
Figure 4:
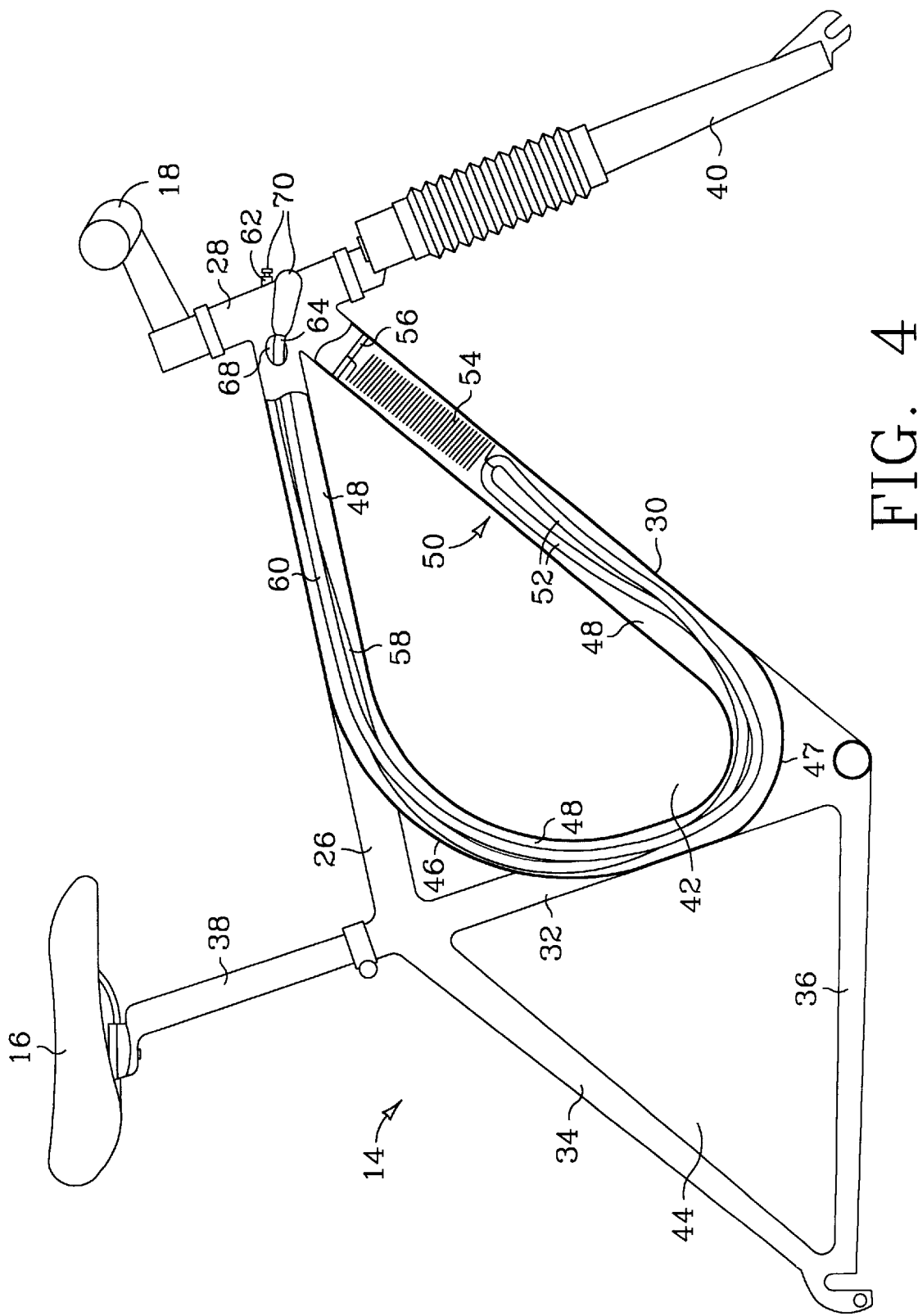

The components of bicycle frame 14 described above appear on most conventional bicycle frames. The front triangle of a conventional bicycle frame is modified somewhat to provide a storage compartment and smooth passageway for the cable locking system of the present invention. Top tube 26 and seat tube 32 are joined at the upper rear corner of front triangle 42 by an upper curved tube segment 46 to form a storage compartment and continuous smooth passageway 48. In the configuration of FIG. 2, compartment/passageway 48 extends from head 28 along top tube 26, through curved tube segment 46 and down seat tube 32. In the configurations of FIGS. 3 and 4, compartment/passageway 48 extends from head 28 along top tube 26, through curved tube segment 46, down seat tube 32, through a lower curved tube segment 47 and up down tube 30.

Still referring to FIGS. 1–4, a cable assembly 50 housed in compartment 48 includes a cable 52, spring 54 and anchor 56. Anchor 56 anchors spring 54 near the bottom of seat tube 32 in the configuration of FIG. 2 and near the top of down tube 30 in the configurations of FIGS. 3 and 4. Anchor 56 represents generally any stationary component affixed to or integral with seat tube 32 sufficient to withstand the forces exerted by spring 54 when cable 52 is fully extended outside bicycle frame 14. The location of anchor 56 will vary depending on the size of frame 14 and the lengths of spring 54 and cable 52 deemed necessary or desirable for a particular application. Cable 52 is constructed from a length of wire rope or some other suitably strong flexible material. Cable 52 is doubled over or otherwise constructed in two parallel lengths or pieces 58 and 60 and secured to spring 54 approximately at its midpoint. As with the cables used in conventional cable locks, it is expected that a wire rope cable 52 will usually include a plastic coating or sleeve to protect the wire rope from corrosive environmental effects and to protect frame 14 and other parts of the bicycle from the abrasive effects of the wire rope. Although spring 54 is depicted in FIGS. 2–4 as an extension type coil spring, other types of springs could be used. What is important is that spring 54 is capable of returning the cable to its stowed position. Therefore, "spring" as that term is used in the Summary, Detailed Description and in the Claims is to be construed broadly to cover any component, device or mechanism that returns the cable to a stowed position in bicycle frame 14.

The free ends 62 and 64 of each length 58 and 60 of cable 52 protrude from storage compartment 48 through a pair of holes 66 and 68 at the front of top tube 26 as shown in FIGS. 1, 2 and 3. Holes 62 and 64 are positioned on opposite sides of top tube 26 so that each length of cable 58 and 60 comes out of compartment 48 on opposite sides of head 28. Using this configuration, cable 52 is automatically secured to bicycle frame 14 at head 28 as it is withdrawn from storage in compartment 48. The free ends 66 and 68 of cable 52 may be fitted with a conventional in-line lock 70 as shown in FIGS. 1–4 or they may be constructed as open loops and secured with a padlock.

In an alternative configuration shown in FIG. 3, the free ends 62 and 64 of cable 52 protrude from storage compartment 48 through a pair of holes 66 and 68 near the middle of top tube 26.

Although tube segments 46 and 47 are called out as curved tube segments, any tube configuration that transitions between the top tube or bottom tube and the seat tube and allows the cable to move back and forth in passageway 48 may be used. Also, segments 46 and 47 need not be discrete components. Upper tube segment 46, for example, might be integral to a top tube that curves or angles down through transition tube segment 46 and into seat tube 32 without also extending horizontally back to the seat tube as in conventional designs.

Figure 5:
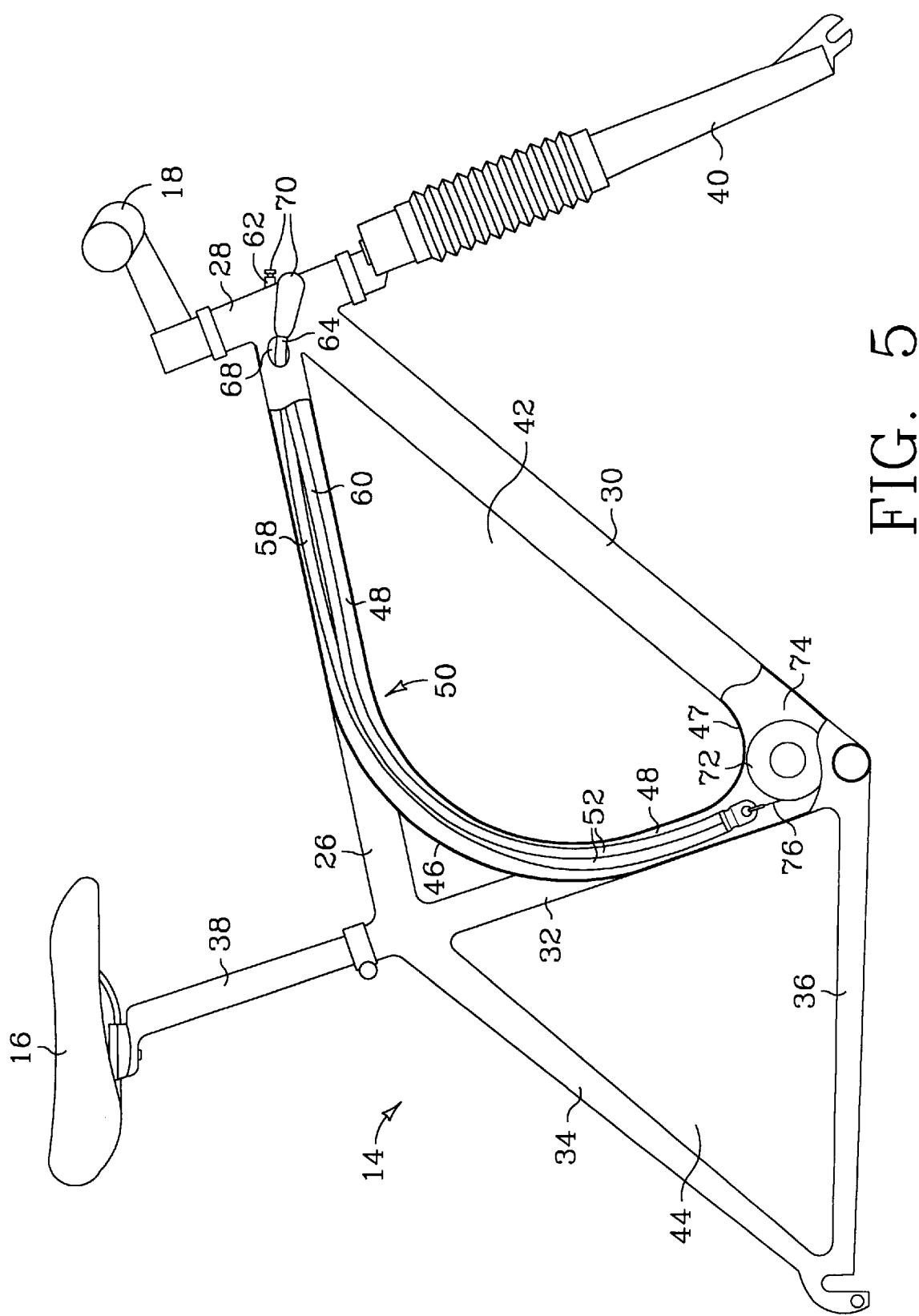
FIG. 5 is a partial cut-away view of one embodiment in which a flat reel type coil spring automatically retracts the double length cable into the bicycle frame.

FIG. 5 illustrates another embodiment of the invention in which a flat reel type coil spring is used to automatically retract a double length cable into the bicycle frame. Referring to FIG. 5, a reel 72 energized by a flat coil spring (not shown) is located in a cavity 74 formed in frame 14 at the bottom of front triangle 42. Cable 52 is operatively connected to reel 72 through a small diameter cord 76. When cable 52 is pulled out of frame 14 to lock bicycle 10, cord 76 unwinds from reel 72 to tightens and thereby energize the flat coil spring. When cable 52 is released, it is retracted into frame 14 as cord 76 is wound back on to reel 72 at the urging of the energized coil spring.

Figure 6:
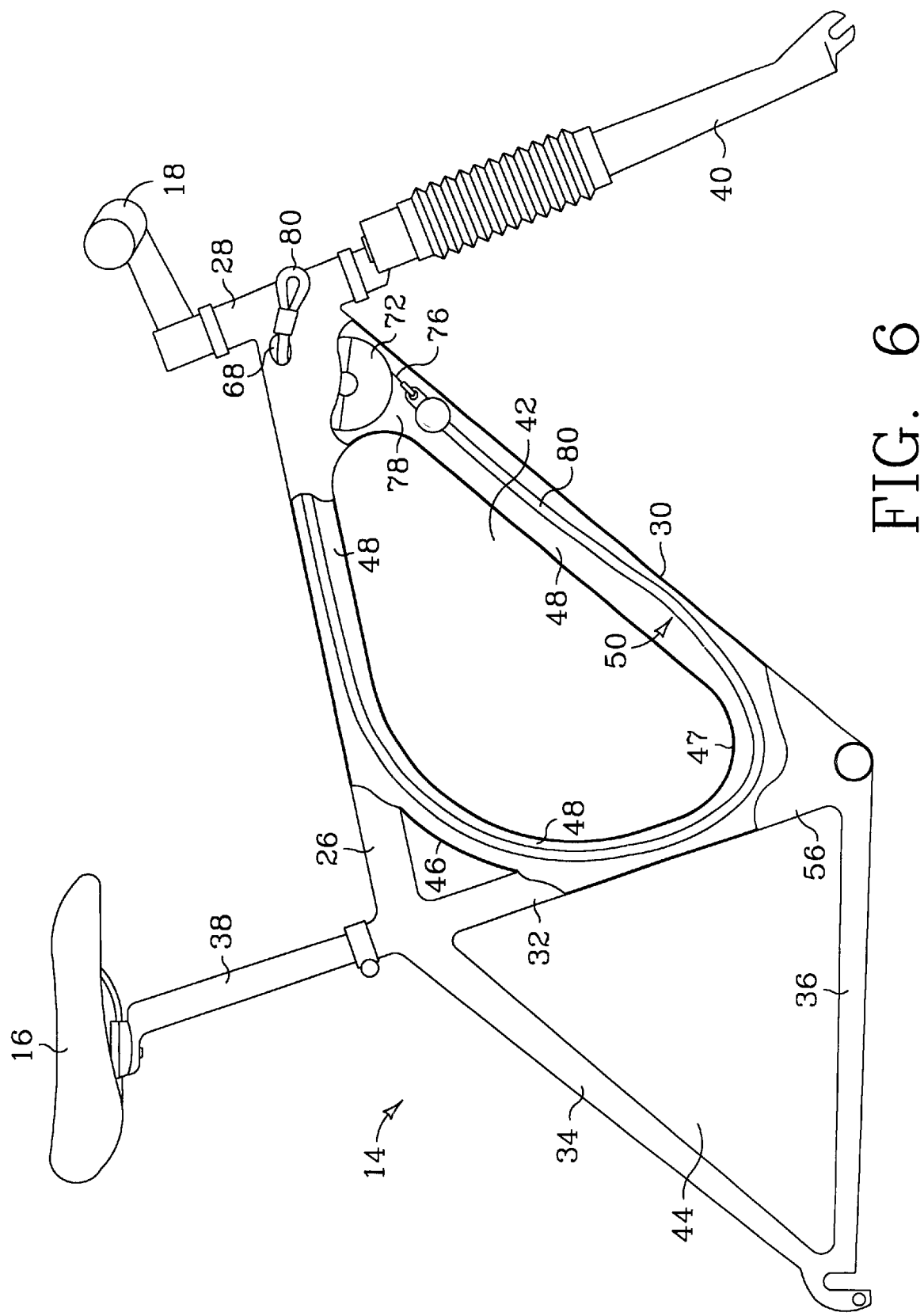
FIGS. 6 and 7 are partial cut-away views of one embodiment of the invention in which a flat reel type coil spring automatically retracts a single length of cable into the bicycle frame.
Figure 7:
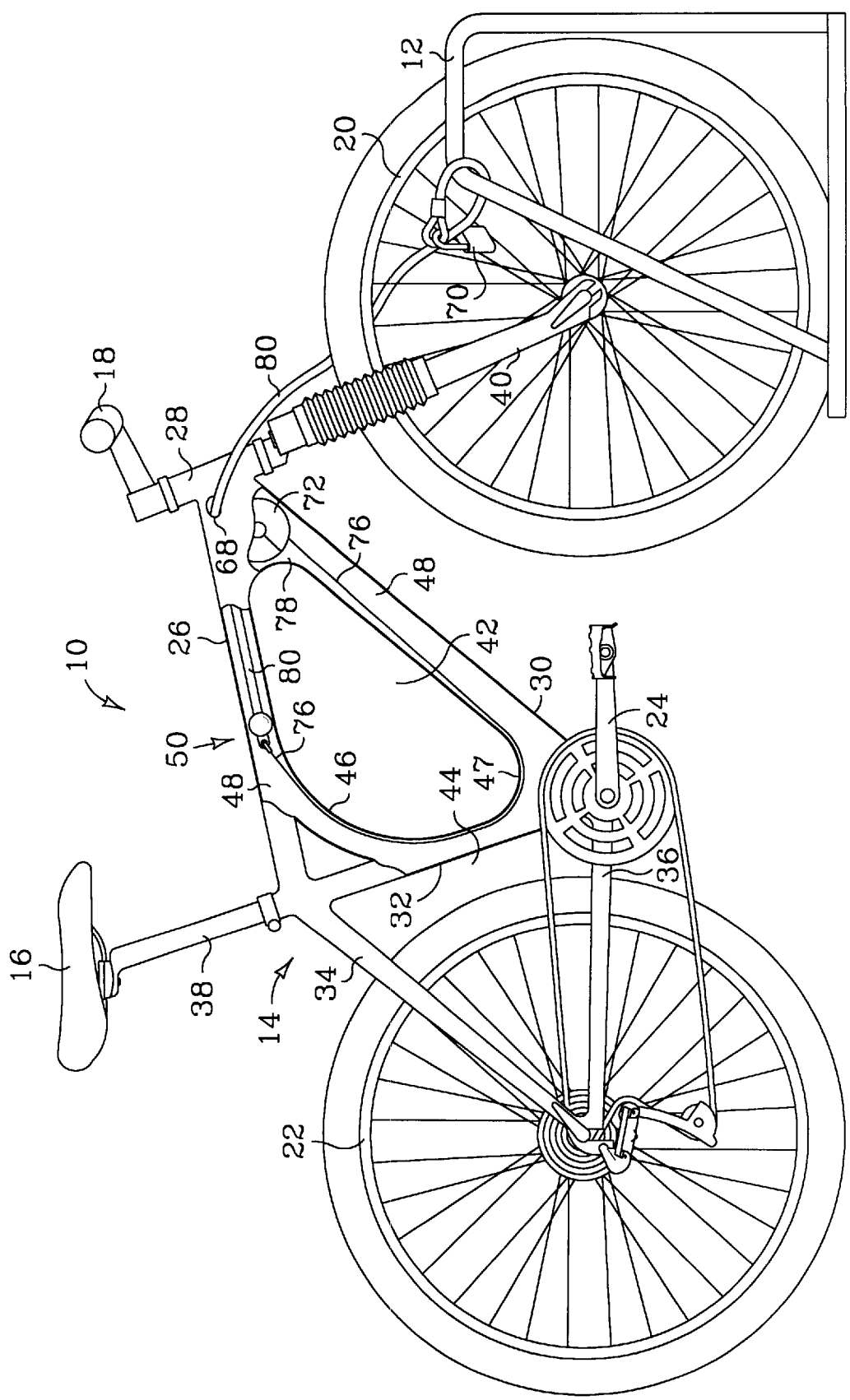

A single cable version of the invented cable locking system using a reel-type retraction mechanism is shown in FIGS. 6 and 7. FIG. 6 shows the cable in the retracted and stowed position. FIG. 7 shows the cable in the extended position secured to a bicycle rack. Referring to FIGS. 6 and 7, a reel 72 energized by a flat coil spring (not shown) is located in a cavity 78 formed in frame 14 at the top front of triangle 42. A single length cable 80 is operatively connected to reel 72 through a small diameter cord 76. When cable 80 is pulled out of frame 14 to lock bicycle 10 as shown in FIG. 7, cord 76 unwinds from reel 72 to tightens and thereby energize the flat coil spring. When cable 80 is released, it is retracted into frame 14 as cord 76 is wound back on to reel 72 at the urging of the energized coil spring.

The reel type retraction mechanism 72, the small diameter retracting cord 76 and the extended compartment/passageway 48 all combine to provide sufficient extension capacity to allow the use of a single length cable 80 with a small diameter reel that can easily be housed within bicycle frame 14. By contrast, conventional reel type retracting mechanisms such as those disclosed in the patents discussed in the Background wind and unwind the locking cable. Hence, these prior art reels must be large to contain a standard size locking cable in which case they cannot be housed within the bicycle frame, or they may be made smaller but only by using a sub-standard or less effective smaller diameter locking cable. In either case, the reel type retraction mechanism of the present invention offers superior functional and cosmetic performance over prior art devices.

Figure 8:
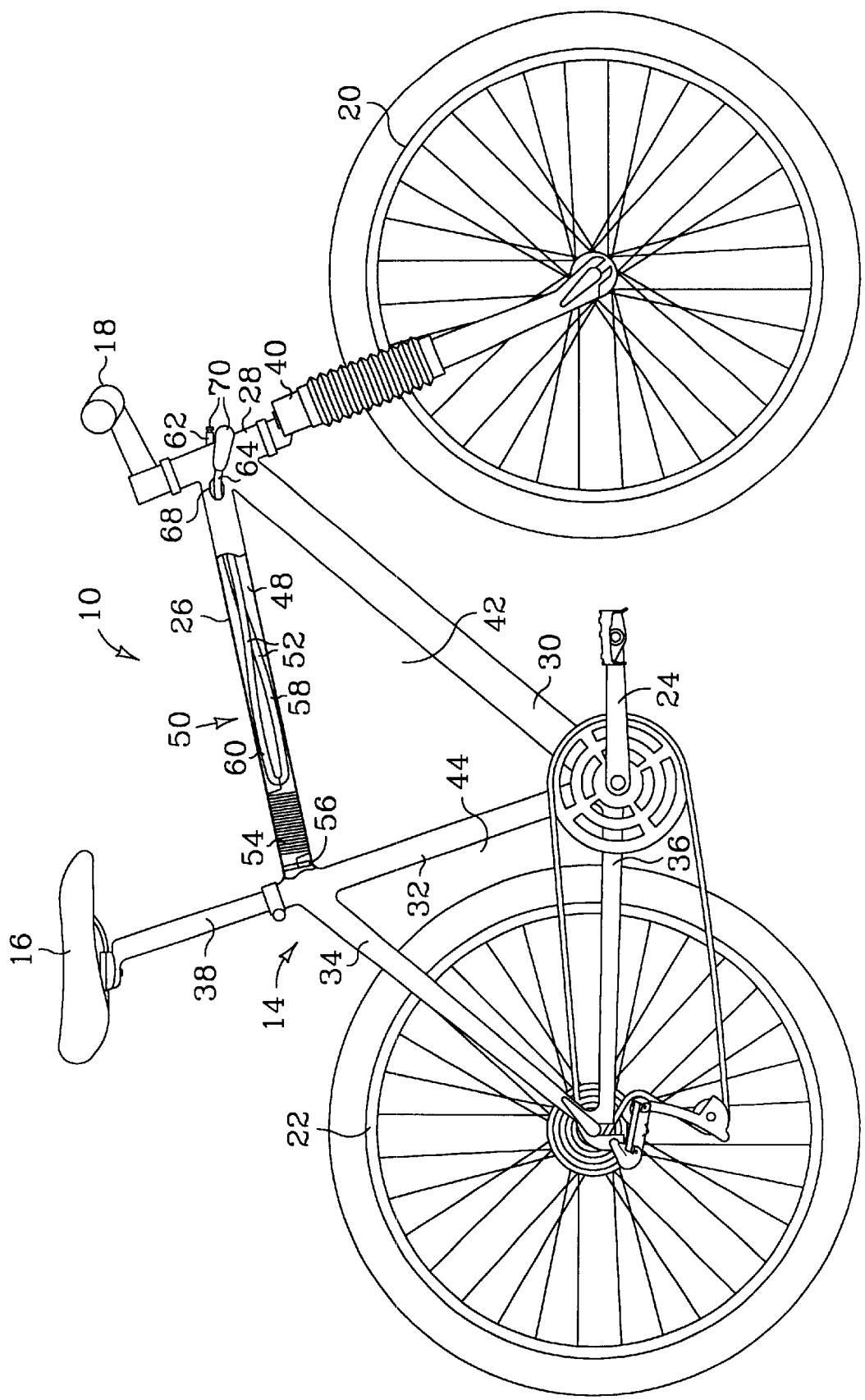
FIGS. 8 and 9 are partial cut-away views of one embodiment in which a double length cable is stowed fully within the top tube of the bicycle frame.
Figure 9:
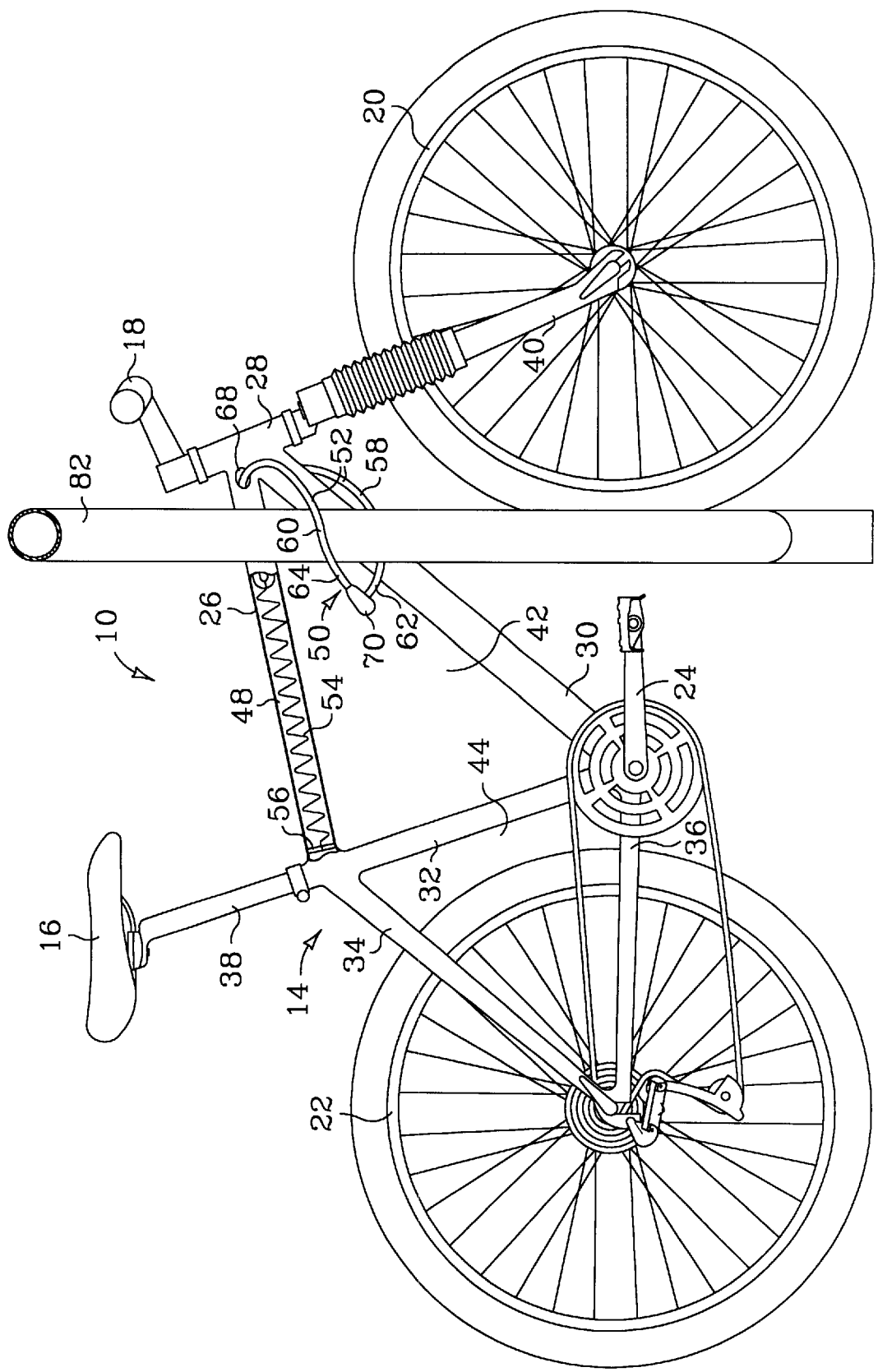

FIGS. 8 and 9 illustrate another embodiment of the invention in which a double length cable 52 is stowed fully within the top tube 26 of bicycle frame 14. FIG. 8 shows cable 52 in the stowed position. FIG. 9 shows cable 52 in the extended position secured to a bicycle rack 82. Referring to FIGS. 8 and 9, anchor 56 anchors spring 54 at the rearward end of top tube 26. This configuration, which eliminates the need for adding the curved segments 46 and 47 of the embodiments shown in FIGS. 1–7, could be used where a shorter locking cable 52 will suffice. A shorter cable may be used, for example, if it is not necessary to lock secure front wheel 20 when bicycle 10 is lock or with serpentine bicycle racks such as rack 82 shown in FIG. 9 in which the bicycle can be positioned along side the rack or other stationary object.

Figure 10:
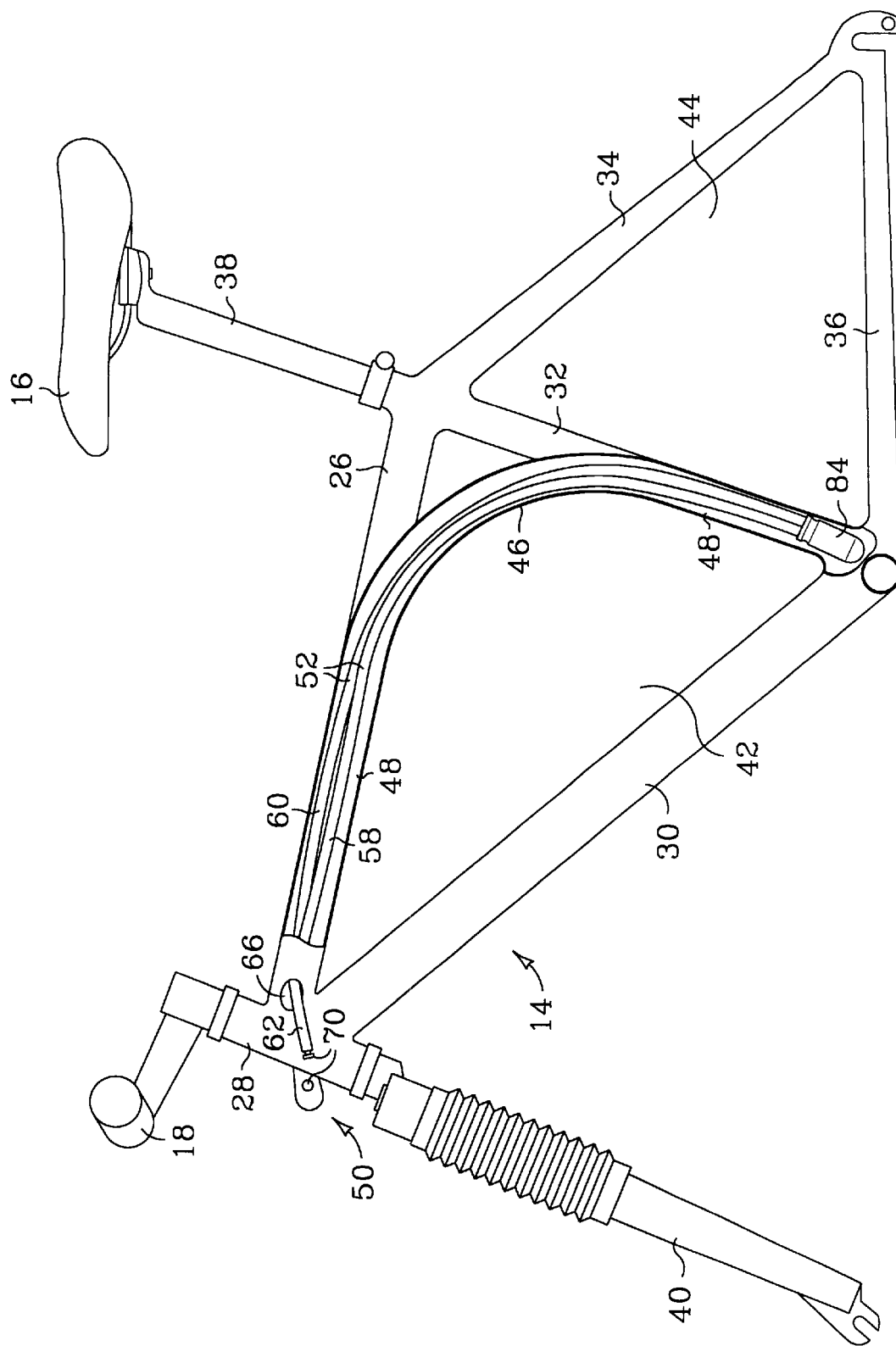
FIG. 10 is a partial cut-away view of one embodiment in which the cable is manually extended and retracted.

In the embodiment shown in FIG. 10, cable 52 is manually extended and retracted. In this embodiment, and referring to FIG. 10, the folded mid-point or stowed ends of double length cable 52 are, preferably, secured with a ferrule 84 or other suitable clamp to facilitate cable 52 sliding along compartment/passageway 48. The weight of cable 52, its downward trajectory and friction in passageway 48 combine to help prevent cable 52 from inadvertently being jostled out of its stowed position.

Figure 11:
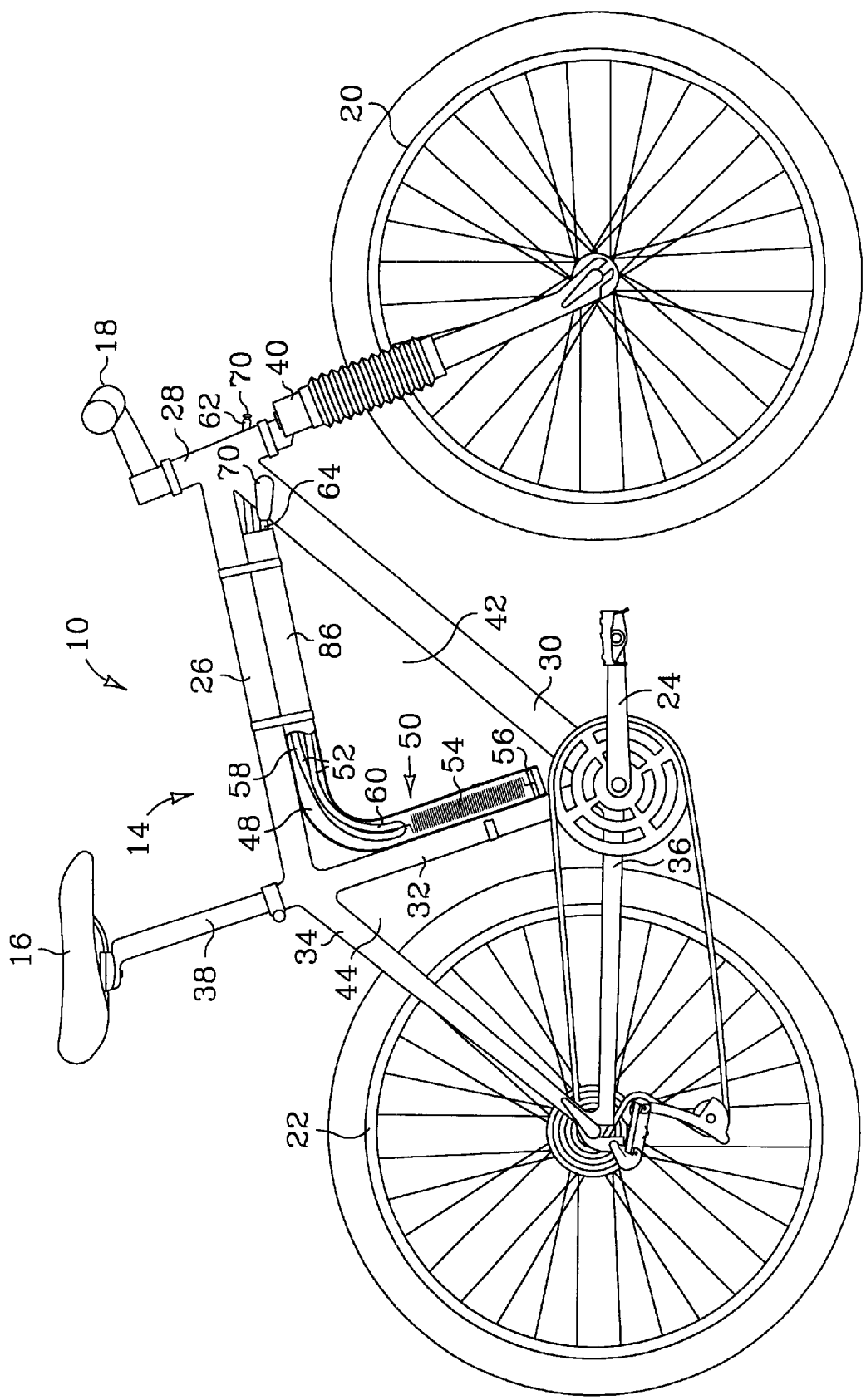
FIGS. 11 and 12 are a partial cut-away views of two alternative embodiments of the invention in which the cable locking system includes a storage tube retrofit to an existing bicycle frame.
Figure 12:
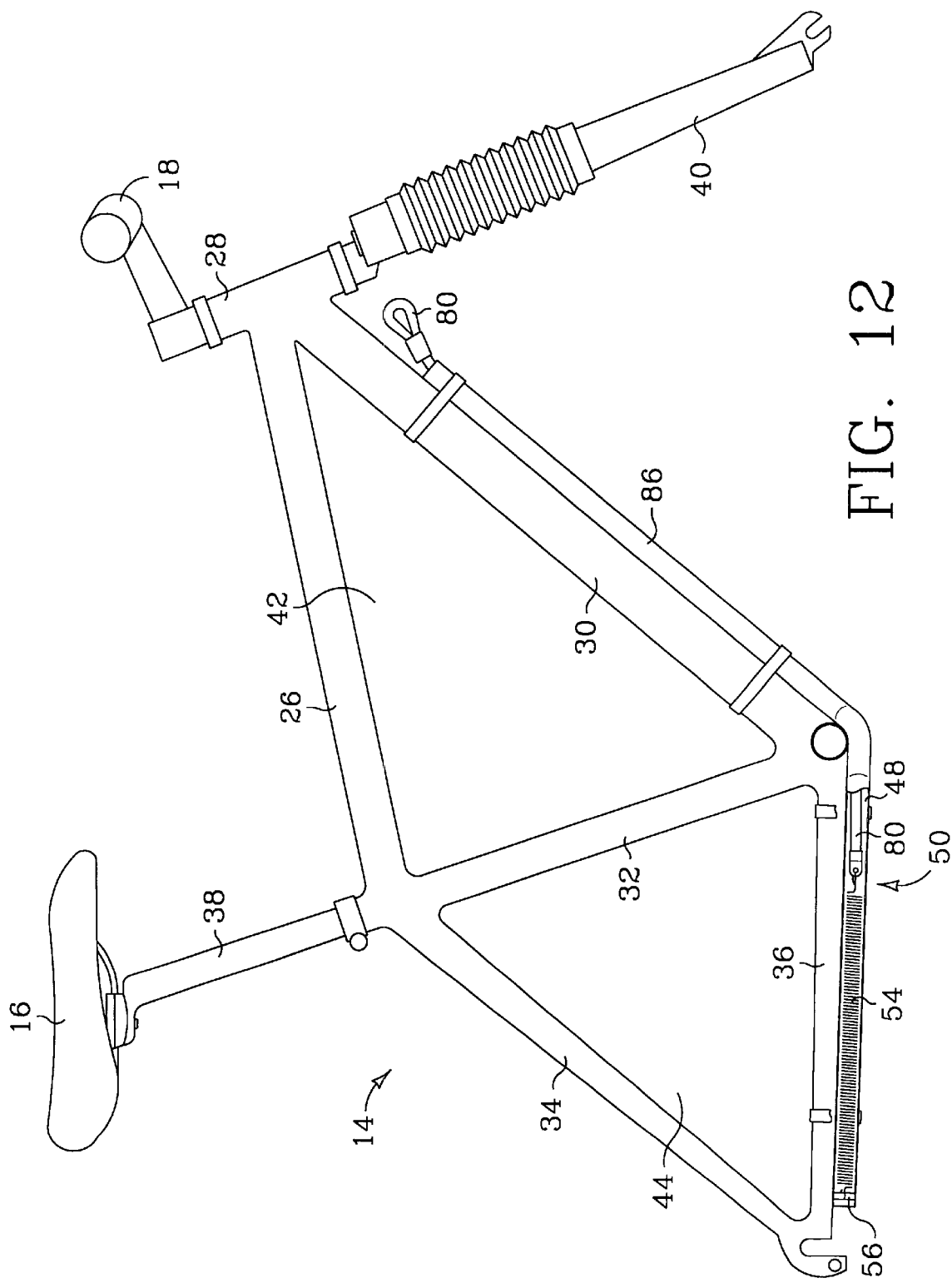

In the embodiment shown in FIGS. 11 and 12, the cable locking system includes a storage tube 86 retrofit to a conventional bicycle frame 88. Anchor 56, spring 54 and double length cable 52 (single length cable 80 in FIG. 12) are positioned in tube 86 as described above and tube 86 is strapped or otherwise secured to top tube 90 and seat tube 92 in FIG. 11 or down tube 30 and chain stay 36 in FIG. 12. Cables 52 and 80 are partially withdrawn from tube 86 in FIG. 11 to better illustrate how each length 58 and 60 of cable 52 is preferably withdrawn on opposite sides of head 28 to automatically secure the bicycle frame 14 at head 28 when cable 52 is locked to a bicycle rack or other stationary object. Tube 86 may be constructed as a flexible tube that will conform to the shape of the one or more of the components of a bicycle frame so that one retrofit locking system can be made to fit more than one model or type of bicycle. Alternatively, tube 86 may be a rigid tube that conforms to the shape of one or more components of a bicycle frame such as might be used for a particular model, size or type of bicycle.

A double length cable is a cable having two adjacent lengths or pieces such as cable 52 shown in the figures and includes a single cable doubled over or discrete lengths of cable. A single length cable is a cable having only one length or piece such as cable 80 shown in the figures.

Although the invention has been shown and described with reference to the foregoing exemplary embodiments, various other embodiments of the invention are possible. It is to be understood, therefore, that these and other embodiments may be made without departing from the spirit and scope of the invention which is defined in the following claims.

What is claimed is:

1. A bicycle frame and cable locking system, comprising:
   a top tube having a front portion and a rear portion, a seat tube disposed at the rear portion of the top tube, and a transition tube segment connecting the top tube and the seat tube;
   a head connected to the front portion of the top tube; and
   a double length cable disposed at least partially in the top tube, seat tube and transition tube segment, the cable having a first length extendible out of the top tube along one side of the head and a second length extendible out of the top tube along the other side of the head, and the cable extendible from and returnable to a stowed position in the top tube, seat tube and transition tube segment.

2. A bicycle frame and cable locking system, comprising:
   a top tube having a front portion and a rear portion;
   a seat tube connected to the rear portion of the top tube;
   a down tube having a front portion and a rear portion;
   a head connected to the front portion of the top tube and the front portion of the down tube;
   a pair of holes in the front portion of the top tube disposed opposite one another on either side of the head;
   a transition tube segment connecting the top tube and the seat tube;
   the top tube, tube segment and the seat tube defining a storage compartment and passageway extending from the seat tube, through the tube segment and along the top tube;
   a spring anchored in the seat tube; and
   a double length cable movably disposed in the passageway and operatively connected to the spring, each length of the cable extending from the spring through the passageway and out through the holes at the front portion of the top tube.

3. The bicycle frame and cable locking system of claim 2, further comprising a lock connected to ends of the cable extending out through the holes in the top tube, the lock operative to selectively join and lock together the ends of the cable.

4. A bicycle, comprising:
   a frame comprising a top tube having a front portion and a rear portion, a seat tube disposed at the rear portion of the top tube, a transition tube segment connecting the top tube and the seat tube, and a head connected to the front portion of the top tube;
   a pedal crank mounted to the frame;
   a front wheel mounted to the frame;
   a handle bar operatively connected to the front wheel;
   a rear wheel mounted to the frame and operatively connected to the pedal crank; and
   a cable disposed at least partially in the top tube, seat tube and transition tube segment, the cable extendible from and automatically retractable into a stowed position in the top tube, seat tube and transition tube segment.

5. A bicycle, comprising:
   a frame comprising a top tube having a front portion and a rear portion, a seat tube connected to the rear portion of the top tube, a transition tube segment connecting the top tube and the seat tube, a down tube having a front portion and a rear portion, and a head connected to the front portion of the top tube and the front portion of the down tube;
   a pedal crank mounted to the frame;
   a front wheel mounted to the frame;
   a handle bar operatively connected to the front wheel;
   a rear wheel mounted to the frame and operatively connected to the pedal crank; and
   a double length cable disposed at least partially in the top tube, seat tube and transition tube segment, the cable extendible from and stowable in the top tube, seat tube and transition tube segment and wherein each length of the cable extends along opposite sides of the head such that the cable straddles the head when the cable is withdrawn from the tube.

* * * * *

UNITED STATES PATENT AND TRADEMARK OFFICE
CERTIFICATE OF CORRECTION

PATENT NO. : 6,505,846 B1
DATED : January 14, 2003
INVENTOR(S) : Thomas W. Hoffman It is certified that error appears in the above-identified patent and that said Letters Patent is hereby corrected as shown below:

Column 1,
Line 11, delete "lead" and insert -- led --

Column 2,
Line 17, delete "or"
Line 56, delete "a"
Line 63, delete "illustrates" and insert -- illustrate --

Column 3,
Line 7, after "14" insert -- that --

Column 4,
Lines 27 and 41, delete "tightens" and insert -- tighten --

Column 5,
Line 5, delete "lock"
Line 6, delete "lock" and insert -- locked --
Line 6, delete "or"

Signed and Sealed this

Twenty-third Day of September, 2003

JAMES E. ROGAN
*Director of the United States Patent and Trademark Office*